(12) United States Patent
Woodman

(10) Patent No.: US 6,988,349 B2
(45) Date of Patent: Jan. 24, 2006

(54) PRINTSTREAM PROCESSING FOR INSERTER SYSTEMS

(75) Inventor: Clare E. Woodman, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 218 days.

(21) Appl. No.: 09/748,995

(22) Filed: Dec. 27, 2000

(65) Prior Publication Data
US 2002/0078660 A1 Jun. 27, 2002

(51) Int. Cl.
B65B 61/20 (2006.01)

(52) U.S. Cl. .................................................. 53/474
(58) Field of Classification Search ............... 53/474, 53/157; 700/220, 222, 227, 223, 226, 252; 709/239, 206, 217
See application file for complete search history.

(56) References Cited

U.S. PATENT DOCUMENTS

| | | | | |
|---|---|---|---|---|
| 4,346,446 A | | 8/1982 | Erbstein et al. | 364/551 |
| 4,547,856 A | * | 10/1985 | Piotroski et al. | 270/56 |
| 5,058,030 A | * | 10/1991 | Schumacher | 700/220 |
| 5,448,490 A | * | 9/1995 | Gottlieb et al. | 700/220 |
| 5,777,883 A | * | 7/1998 | Lau et al. | 700/220 |
| 5,928,323 A | * | 7/1999 | Gosling et al. | 709/203 |
| 5,933,584 A | | 8/1999 | Maniwa | 395/111 |
| 6,009,416 A | * | 12/1999 | Pintsov | 705/410 |
| 6,025,925 A | | 2/2000 | Davidson, Jr. et al. | 358/1.15 |
| 6,026,385 A | | 2/2000 | Harvey et al. | 705/408 |
| 6,049,775 A | * | 4/2000 | Gertner et al. | 705/8 |
| 6,105,340 A | * | 8/2000 | Draghetti | 53/136.1 |
| 6,119,051 A | * | 9/2000 | Anderson et al. | 700/221 |
| 6,343,327 B2 | * | 1/2002 | Daniels et al. | 709/239 |

OTHER PUBLICATIONS

"Print Management Solutions Overview", Barr Systems Home page, www.barrsystems.com.

* cited by examiner

Primary Examiner—John Paradiso
(74) Attorney, Agent, or Firm—Michael J. Cummings; Charles R. Malandra, Jr.; Angelo N. Chaclas

(57) ABSTRACT

Generating a printstream in a computer that is preferably remote from the one or more inserter systems. Once generated, the printstream is transmitted preferably to a high speed, high volume, printer for producing the printed documents to be included in the mail pieces, such as billing statements. The printed documents are then delivered to the one or more inserter systems, which are to be used as the input sheets in the one or more inserter systems. The print stream is also provided to a workstation computer coupled to the one or more inserter systems. This workstation interpolates the printstream in order to generate a reprint database containing electronic files corresponding to each of the printed documents. Also coupled to the workstation is a local printer, which may be used to generate documents, for re-processing purposes, from data received from the reprint database. The work station also interpolates the printstream in order to generate a job tracking database, which database contains the job level data for the mail pieces that are to be assembled in the one or more inserter systems.

3 Claims, 4 Drawing Sheets

PRINTSTREAM PROCESSING FOR INSERTER SYSTEMS

I. FIELD OF THE INVENTION

Figure 1A:
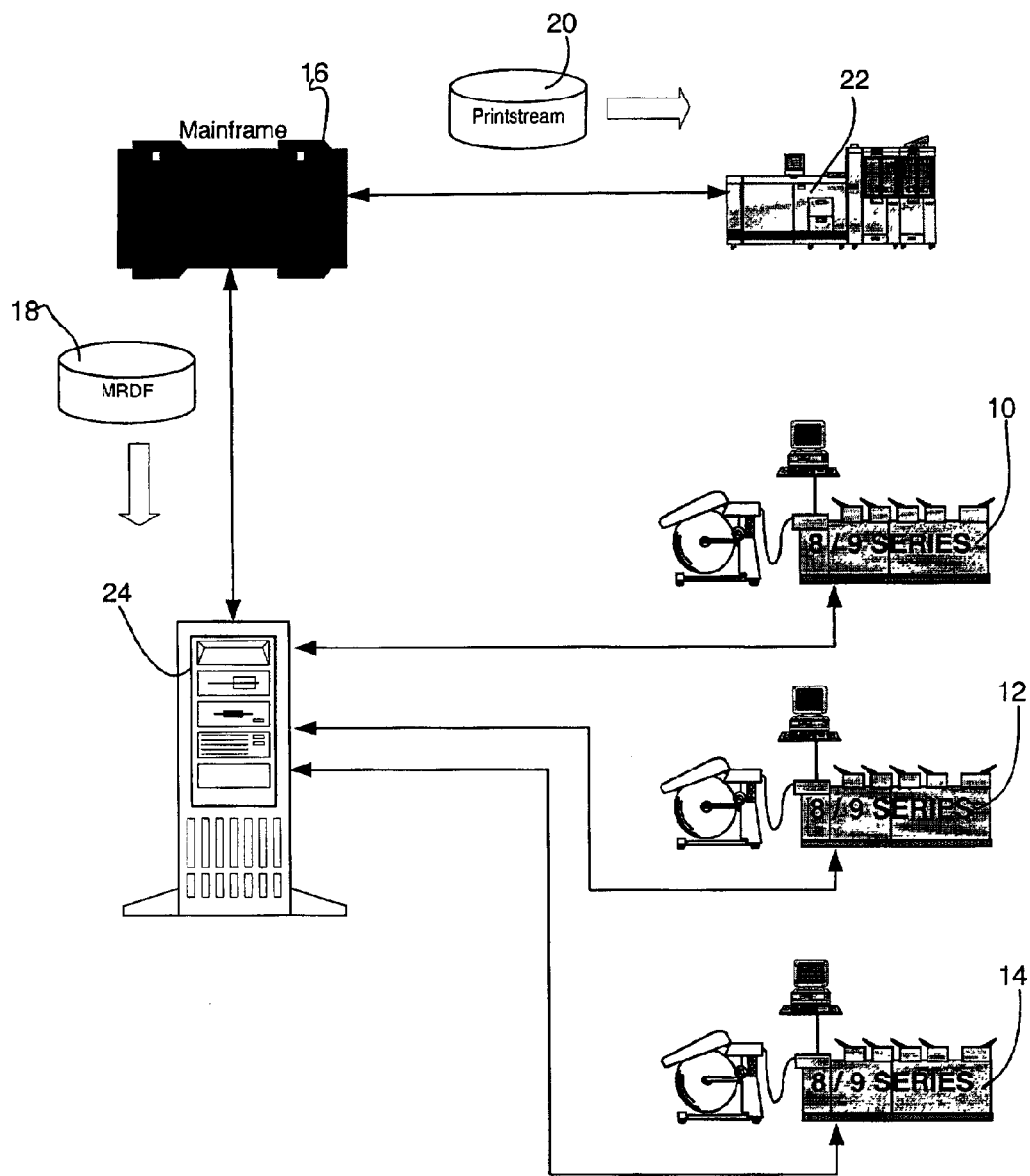

The present invention relates generally to a system and method for processing a mail run on a plurality of inserter systems and, more particularly, to such a system and method for processing the print stream to be used with a plurality of inserter systems.

II. BACKGROUND OF THE INVENTION

The use of inserter systems, such as the Series 9 Inserter Systems manufactured by Pitney Bowes Inc. of Stamford Conn., is well known. Such inserter systems are used by certain organizations for assembling large amounts mailpieces for dispatch through the postal system. Examples of such organizations are: banking institutions, utility companies, insurance companies, credit companies, and the like. Typically, such organizations create documents, such as billing documents, in a mainframe computer system that is separate from the inserter system that will process the documents into such mailpieces. Each batch of documents is generally referred to as a "mail run".

Generally, inserter systems have processed mail runs based on control codes printed on the documents being processed. Early versions of the inserter systems recognized limited control information, such as first document of a mailpiece and number of documents in a mailpiece. Later versions evolved into more sophisticated control applications, such as prioritized selections of optional inserts.

Most recently, inserter system technology has evolved to include the processing of a mail run based on an electronic data file, referred to herein as a mail run data file ("MRDF") that is generated off line from the inserter system, for example, by the mainframe computer, which created the mail run documents. The MRDF is a file containing individual mailpiece records for all the mailpieces in a mail run. Since the inserter system performs document tracking for each of the mailpieces based on the mailpiece record in the MRDF, the inserter system can verify the mail run integrity against the MRDF. Thus, the inserter system can detect duplicate mailpieces, missing mailpieces and can provide a summary of such detections.

Such inserter systems that implement an MRDF commonly utilize existing batch processing applications, typically referred to as 'legacy' systems because they are relatively old systems handed down from previous generations of company management. However, these systems still are effective and often control processing of data relating to a core element of a company's business, such as bill production. Such legacy systems for mass mailing document production run on a main frame computer are complex and expensive, and mailers are reluctant to modify, upgrade or replace these critical document generation applications.

Generally, high volume mailers that process large mail runs on a continuous basis use several inserter systems in parallel to achieve a desired, high volume, mail run rate. However, each one these several inserter systems are commonly not of the same manufacturer. For example, some of the inserter systems may be manufactured by Pitney Bowes Inc., well others may be manufactured by third party vendors such as Bell & Howell, Bōwe or Kern. Wherein each of these third party inserter system requires its own native MRDF. Thus if a high volume mailer adds third party equipment relative to its existing inserter systems, modification of how the MRDF is generated would be needed in the mailer's mainframe computer. But, as pointed out above, mailers are reluctant to do this in view of the complexity and cost involved.

Therefore, the control of multiple inserter systems running a single mail run has been limited to controlling each inserter system separately from one another. Such control requires an inspection of some type to verify the integrity of the completed mail run. Thus, such high volume mailers have given up the mail run integrity associated with the MRDF processing on multiple inserter systems.

It is thus an object of the present invention to provide MRDF processing using the multiple inserter systems while not requiring modification of the mailers legacy mainframe computer. It is a further object of the present invention to achieve the same level of mail run integrity for a mail run processed on multiple inserter systems as would be achieved if processed on a single inserter system.

III. SUMMARY OF THE INVENTION

Accordingly, the present invention relates to a method of processing mail pieces on one or more inserter systems and without modification to a mailer's mainframe computer.

The present invention method includes generating a printstream in a computer that is preferably remote from the one or more inserter systems. Typically it is the mailer's mainframe computer that generates the printstream. Once generated, the printstream is transmitted preferably to a high speed, high volume, printer for producing the printed documents to be included in the mail pieces, such as billing statements. The printed documents are then delivered to the one or more inserter systems, which are to be used as the input sheets in the one or more inserter systems.

In addition to the printstream being provided to the high speed, high volume printer, the print stream is also provided to a workstation computer coupled to the one or more inserter systems. This workstation then interpolates the printstream in order to generate a reprint database containing electronic files corresponding to each of the printed documents as was produced by the high speed, high volume printer. Preferably, also coupled to the workstation is a local printer, which may be used to generate documents, for re-processing purposes, from data received from the reprint database. The work station further interpolates the printstream in order to generate a job tracking database, which database contains the job level data for the mail pieces that are to be assembled in the one or more inserter systems.

The one or more inserter systems then process the printed documents to generate the mail pieces. Preferably, while the inserter systems are processing the mailpieces, the data in the job tracking database may be associated with each one of the inserter systems so as to monitor the performance of the one or more inserter systems.

IV. BRIEF DESCRIPTION OF THE DRAWINGS

Figure 1B:
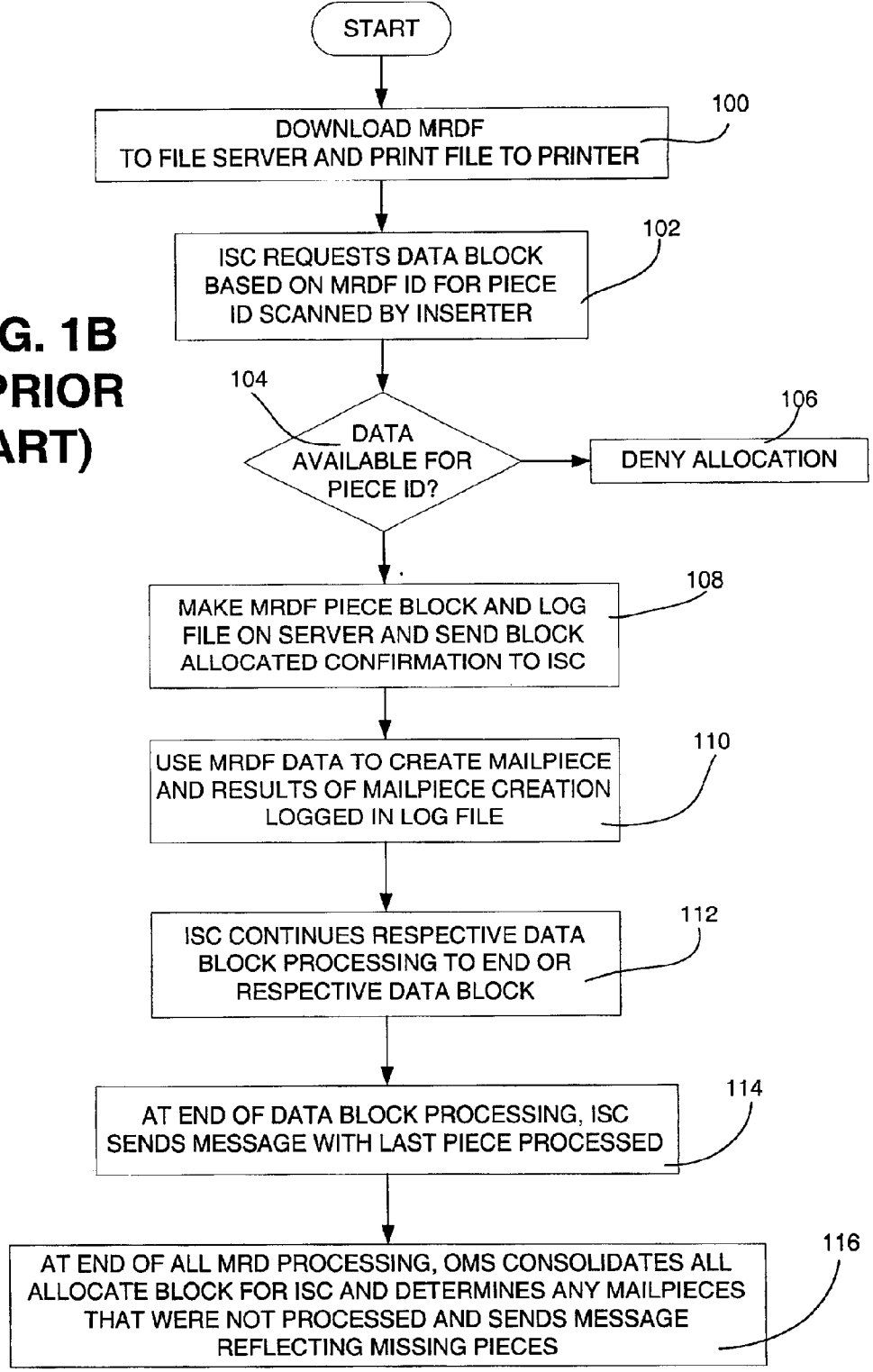
Figure 2A:
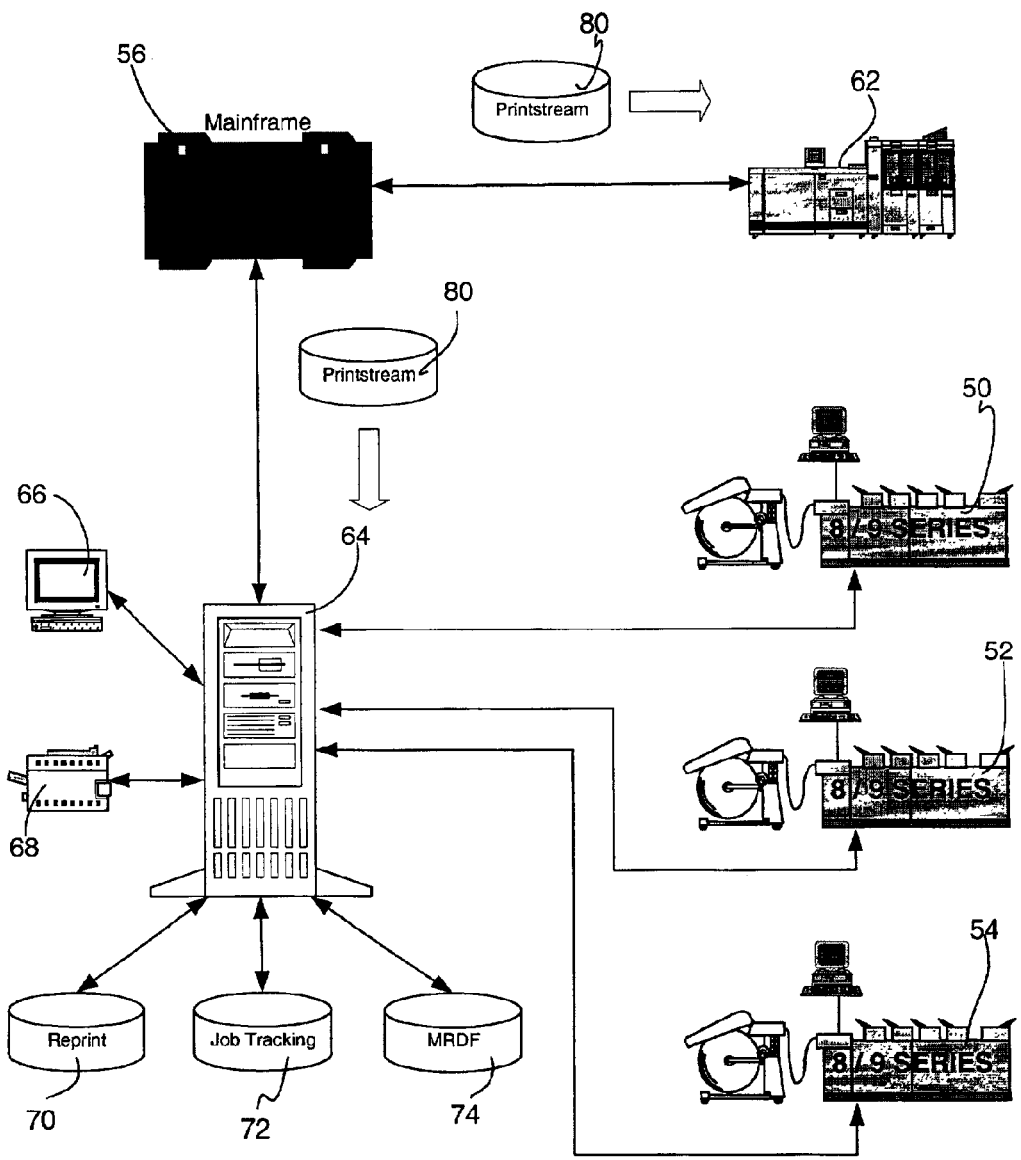
Figure 2B:
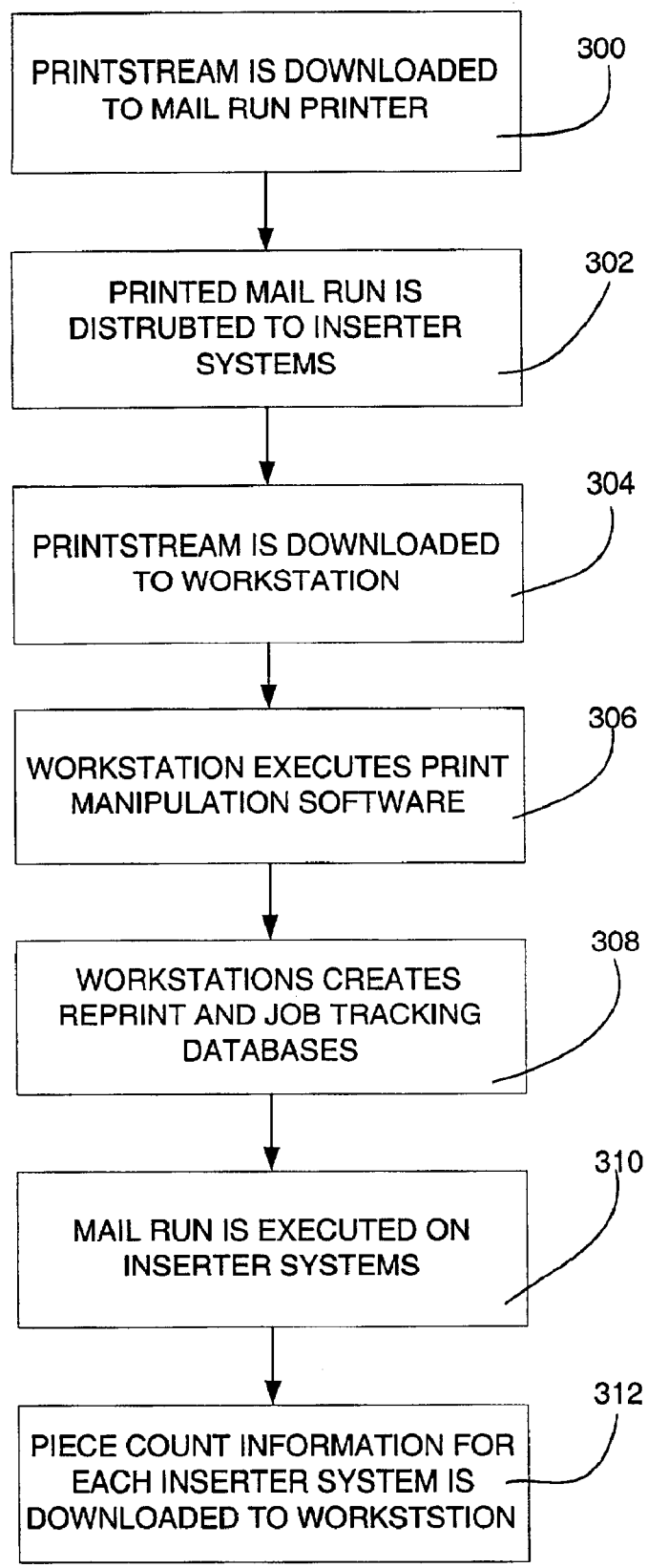

The above and other objects and advantages of the present invention will be apparent upon consideration of the following detailed description, taken in conjunction with accompanying drawings, in which like references characters refer to like parts throughout, and in which:

FIGS. 1a and 1b are respectively a flowchart and system level diagram depicting a prior art mailing system; and FIGS. 2a and 2b are respectively a system level diagram and flowchart depicting a mailing system in accordance with the present invention.

V. DETAILED DESCRIPTION OF THE PREFERRED EMBODIMENT

In describing the present invention, reference is made to the drawings, wherein there is seen FIG. 1B a flow chart of prior art mail run data file processing on multiple inserter systems 10, 12 and 14, as depicted in FIG. 1A. When a mail run is generated by the mainframe computer 16, a mail run data file ("MRDF") 18 is also created by the mainframe computer 16. The MRDF contains a record of information for every mailpiece in a mail run. For each mailpiece, the mainframe computer generates a barcode that contains a mail run data file identifier and a mailpiece ID corresponding to the mailpiece record in the MRDF.

At step 100, a print file 20 for the mail run is downloaded to a printer 22 for the printing of the mail run and afterwards the printed mail run is transported to the individual inserter systems 10, 12 and 14 that are responsible for assembling the mail run. Also at step 100, the MRDF is downloaded to a file server 24, also commonly referred to herein as the "work station", which communicates with each inserter system 10, 12 and 14. Preferably, when an inserter system begins processing a mail run, the inserter system scans the barcode of each document being processed and, at step 102, the inserter system controller (ISC) requests a data block based on the MRDF ID and mailpiece ID scanned from the barcode. The data block is a subset of the MRDF. The work station 24 responds to the request by either downloading to the inserter system, at step 108, the data block corresponding to the MRDF ID and mailpiece ID, or denying allocation, at step 106, because the MRDF ID or mailpiece ID is not correct, or because the mailpiece ID is a duplicate to one previously processed in the mail run. At step 110, the ISC of an inserter system uses MRDF data to create the mailpiece on an inserter system 10, 12 and 14 and sends the results of the mailpiece creation to the work station 24 which logs such results in a log file. At step 112, the ISC of an inserter system 10, 12 and 14 continues data block processing to the end of each respective block and requests the next block from the work station 24 at step 114. For subsequent data block steps 102–112 are repeated. Each inserter system 10, 12 and 14 then processes the mailpieces through the end of the block of data, and automatically requests additional block of data until the last mailpiece in the mail run is processed. During mailpiece processing, each inserter system 10, 12 and 14 tracks and reports back to the work station 24 the damaged, duplicate or missing mailpieces within the data block. The inserter system 10, 12 and 14 notifies the work station 24 when the last mailpiece has been processed, at step 114. At the end of mailpiece processing, the work station 24 verifies that all mailpieces were in fact processed and identifies all mailpieces not processed for the mail run, at step 116.

It is to be appreciated that even though the above described system and method for processing a mail run on multiple inserters has proven successful in the past, it has been limited to applications wherein the inserter systems 10, 12 and 14 are of a common manufacture. That is, since the MRDF 18 that is downloaded from the mainframe 16 to the work station 24 is shared with all the inserter systems 10, 12 and 14 coupled to the work station 24, the MRDF 18 must be readable by all the inserter systems 10, 12 and 14. Thus, each inserter system 10, 12 and 14 must have an ISC capable of interpolating the MRDF 18. And since the ISC is proprietary to the manufacturer of the inserter system (e.g., Pitney Bowes), the MRDF 18, as downloaded from the mainframe 16, must be in a format suitable for reading by each ISC of each inserter system 10, 12 and 14 that is coupled to the work station 24 and is responsible for executing the mail run of the MRDF 18. Thus, if a particular high volume mailer has a work station coupled to three inserter systems, each of differing manufactures (e.g., Pitney Bowes, Kern, Bell & Howell, etc.), the MRDF that was downloaded may only be in a format to be read by at most one of the inserter systems, since each inserter system has an ISC (as programmed by its manufacturer) requiring an MRDF in its own proprietary format. Hence, the MRDF may only be used by one of the aforesaid three inserter systems.

It is to be appreciated that modifying the mainframe so as to compile the MRDF to be readable be another proprietary type of ISC is highly disadvantageous in view of the complexity, cost and downtime of the mainframe that would be required to do so.

The present invention overcomes the shortcomings of requiring the MRDF that is downloaded from the mainframe to be in a proprietary format suitable for interpolation by the ISC of the inserter systems coupled to the work station that is receiving the MRDF. As will be described in detail below, the present invention eliminates the requirement that the MRDF be processed on the mainframe and downloaded to the work station as it rather provides a system and method for downloading the printstream of the mail run to the work station (instead of the MRDF) for enabling the work station to process the mail run on multiple inserter systems regardless of the manufacture, or more precisely, the proprietary type of ISC associated with each inserter system.

With reference to FIG. 2a, there is shown a system level diagram of the present invention that is substantially similar to that of the prior art system depicted in FIG. 1 including a mainframe 56 coupled to a work station 64 and printer 62 for creating the printed documents of the mail run. Coupled to work station 64 are a plurality of inserter systems 50, 52 and 54. It is to be appreciated that for ease of illustration, only three inserter systems 50, 52 and 54 are shown coupled to the work station 64. But of course more or less than three inserter systems may be coupled to the work station 64. It is also to be appreciated that each of the inserter system may or may not be from a common manufacturer having compatible, or incompatible, ISC's.

Further coupled to the work station 64 is a PC user's terminal 66 and a printer 68. As will be discussed below, work station 64 creates a reprint database 70 and a job tracking database 72.

Referring now also to FIG. 2B, in operation, the mail run printstream 80 is downloaded from the mainframe 56 to the mail run printer 62 which is now enabled to print the documents that constitute the mail run (step 300). These printed documents are then distributed to the mail shop 40, and more particularly, the inserter systems 50, 52 and 54 that will be executing the mail run (step 302). The mail run printstream 80 is then also download from the mainframe 56 to the work station 64 of the mail shop 40 (step 304). It is to be appreciated that the printstream 80 may be downloaded to the work station 64, prior to, concurrent with, or subsequent to it being downloaded to the printer 62.

Once the printstream 80 is downloaded to the work station 64, the work station may interpolate the contents of the printstream in order to extract certain data therefrom (step 306). The work station does this by executing preloaded print manipulation software, such as the Streamweaver™ print manipulation software, as marketed by Pitney Bowes Inc, which among other things may extract page counts, insert information and optical marker readings (OMR). Through the execution of extracting data from the printstream 80 (via the print manipulation software), the work station 64 preferably produces a reprint database 70 and a job tracking database 72 (step 308).

The reprint database 70 contains an electronic copy of each document in the mail run as was printed by the mail run printer 62. Thus, in the event a piece of mail was destroyed or improperly assembled during execution of the mail run by one of the inserter systems 50, 52 or 54, an operator (via through the input of instructions to PC terminal 66) may reprint all, or some, of the documents for this mail piece from the local printer 68 coupled to workstation 64 (which print data was provided thereto from reprint database 72).

In regards to the aforesaid job tracking database 72, it creates what is known as job level data for the mail run that is being executed on the inserter systems 50, 52 and 54. Such job level data includes the total number of mailpieces contained in the printstream, the total amount of postage required for the mail run and the types and amount of inserts that are needed for the mail run. The generation of this data enables the mail room operator to prepare for a mail run on the inserter systems 50, 52 and 54. For instance, the operator can ensure that: the postage machines of each inserter system have an adequate amount of postage; there are enough inserter systems and operators available and there are enough designated inserts available.

The mail run is then executed on the inserter systems 50, 52 and 54, whereby the printed sheets that are received from the printer 62 are assembled into prearranged mailpieces (step 310). The workstation 64 is able to monitor the performance of each inserter system through piece count tracking. (step 312).

In another embodiment of the present invention, data extraction of the printstream 80 in workstation 64 may also be used to create an MRDF 74 for the mail run. The MRDF is essentially a piece level database for the mail run, thus containing information about each individual document in the mail run. As is customary, this MRDF 74 may be downloaded to an inserter system 50, 52 or 54 having an ISC capable of interpolating the MRDF so as to enhance it piece tracking and monitoring functions. But as stated above each inserter system may not have an ISC capable of executing the MRDF 74, thus the need for the generation of the job tracking database 72 and the reprint database 70. The MRDF 74 may be downloaded to an electronic document generation system, such as the Digital Document Delivery™ as marketed by Pitney Bowes. Such electronic document generation system perform what has become known as Electronic Billing, Presentation and Payment (EBPP) functions.

In summary, a system and method for processing a printstream in a workstation coupled to one or more inserter systems has been described. Although the present invention has been described with emphasis on particular embodiments, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method of processing mail pieces on a plurality of inserter systems without modification to a mailer's legacy computer system, each of the plurality of inserter systems having different proprietary control systems, the method comprising the steps of:

generating a printstream in the mailer's computer remote from the plurality of inserter systems;

transmitting the printstream from the mailer's computer to a printer for producing printed documents;

delivering the printed documents from the printer to the plurality of inserter systems;

transmitting the printstream from the mailer's computer to a workstation computer coupled to the plurality of inserter systems;

interpolating the printstream in the workstation computer to generate reprint data containing electronic files corresponding to each of the printed documents produced by the printer;

interpolating the printstream in the work station computer to generate job tracking data containing job level data for the mail pieces that are to be assembled in the plurality of inserter systems;

processing the printed documents in the plurality of inserter systems for generating the mail pieces; and associating data from the job tracking data with the generated mail pieces to monitor the performance of the plurality of inserter systems, interpolating the printstream in the work station computer to generate one or more Mail Run Data Files (MRDF) in an appropriate format for each of the different proprietary control systems and containing piece level data for the mail pieces that are to be assembled in the plurality of inserter systems; and providing the one or more Mail Run Data Files to the plurality of inserter systems interpolating the Mail Run Data Files for operation of each inserter system interpolating the Mail Run Data Files.

2. A method of processing mail pieces on the plurality of inserter systems as recited in claim 1 further including the step of:

providing the Mail Run Data Files to an electronic document processing and presentment system to enable electronic generation and delivery for at least some of the mail pieces contained in the printstream.

3. A method of processing mail pieces on a plurality of inserter systems as recited in claim 1 further including the steps of:

providing a local printer coupled to the work station computer; and generating documents on the local printer from data received from the reprint data.

* * * * *